(12) United States Patent
Miyaoka

(10) Patent No.: US 7,136,328 B2
(45) Date of Patent: Nov. 14, 2006

(54) MAGNETO-OPTICAL RECORDING DEVICE CAPABLE OF SETTING THE TIME PHASE OF LASER PULSES AND MAGNETIC FIELDS

(75) Inventor: Yasuyuki Miyaoka, Kanagawa (JP)

(73) Assignee: Canon Kabushiki Kaishi, Tokyo (JP)

( * ) Notice: Subject to any disclaimer, the term of this patent is extended or adjusted under 35 U.S.C. 154(b) by 509 days.

(21) Appl. No.: 10/419,845

(22) Filed: Apr. 22, 2003

(65) Prior Publication Data
US 2003/0202429 A1    Oct. 30, 2003

(30) Foreign Application Priority Data
Apr. 26, 2002   (JP) .............................. 2002-126160

(51) Int. Cl.
*G11B 11/21* (2006.01)
(52) U.S. Cl. .................................. 369/13.27
(58) Field of Classification Search ............. 369/13.27, 369/13.26
See application file for complete search history.

(56) References Cited

U.S. PATENT DOCUMENTS

| | | | |
|---|---|---|---|
| 5,091,897 A | 2/1992 | Otokawa et al. ............... 369/13 |
| 5,233,578 A | 8/1993 | Yamamoto et al. ........... 369/13 |
| 5,398,227 A | 3/1995 | Miyaoka et al. ............. 369/116 |
| 5,475,666 A * | 12/1995 | Ito et al. .................. 369/13.27 |
| 5,537,381 A * | 7/1996 | Fuji ........................ 369/13.27 |
| 5,623,472 A * | 4/1997 | Bakx et al. ............... 369/13.27 |
| 5,953,289 A | 9/1999 | Miyaoka ...................... 369/13 |
| 6,069,852 A | 5/2000 | Miyaoka et al. .............. 369/13 |
| 6,125,084 A * | 9/2000 | Sukeda et al. ........... 369/13.27 |
| 6,125,085 A * | 9/2000 | Fuji et al. ................ 369/13.27 |
| 6,246,641 B1 | 6/2001 | Miyaoka ...................... 369/13 |
| 6,249,490 B1 | 6/2001 | Miyaoka ...................... 369/13 |
| 6,314,061 B1 | 11/2001 | Miyaoka ...................... 369/13 |
| 6,552,967 B1 * | 4/2003 | Tsutsui et al. ........... 369/13.27 |
| 6,661,744 B1 * | 12/2003 | Edanami .................. 369/13.27 |

FOREIGN PATENT DOCUMENTS

JP     2000-40273     2/2000

OTHER PUBLICATIONS

The copy of Computer Translation of KODA Tomohiro (JP, 2000-040,273), abstract, detailed description and the claims.*

* cited by examiner

*Primary Examiner*—Tan Dinh
(74) *Attorney, Agent, or Firm*—Fitzpatrick, Cella, Harper & Scinto

(57) ABSTRACT

The present invention provides a magneto-optical recording method capable of securing a sufficient phase margin, even if a recording power or medium temperature fluctuates, and obtaining a reproduction signal having a preferable quality, wherein the time phases of a laser pulse and a modulation magnetic field are set to a time phase of maximizing in which a recording power margin.

10 Claims, 14 Drawing Sheets

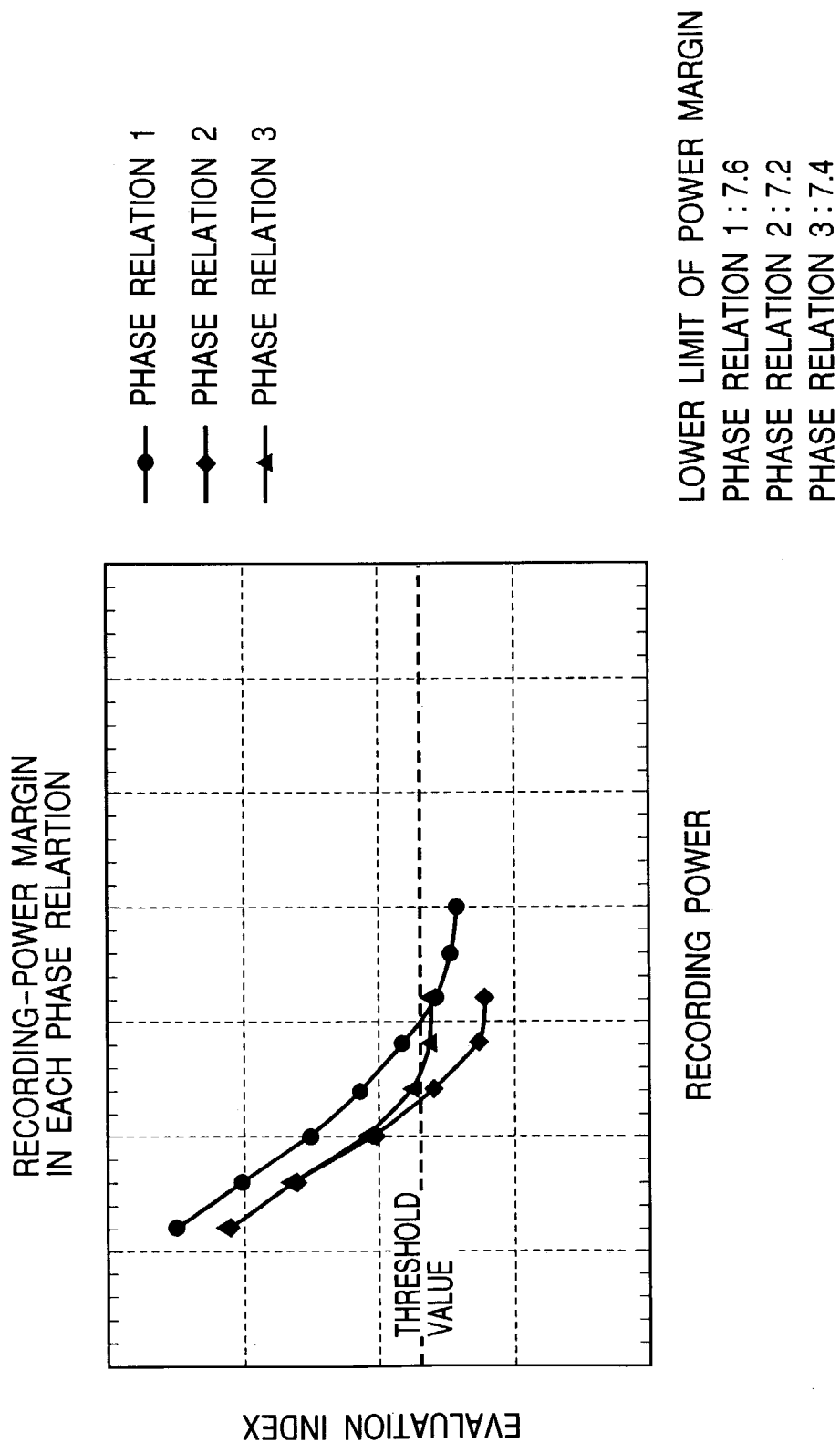

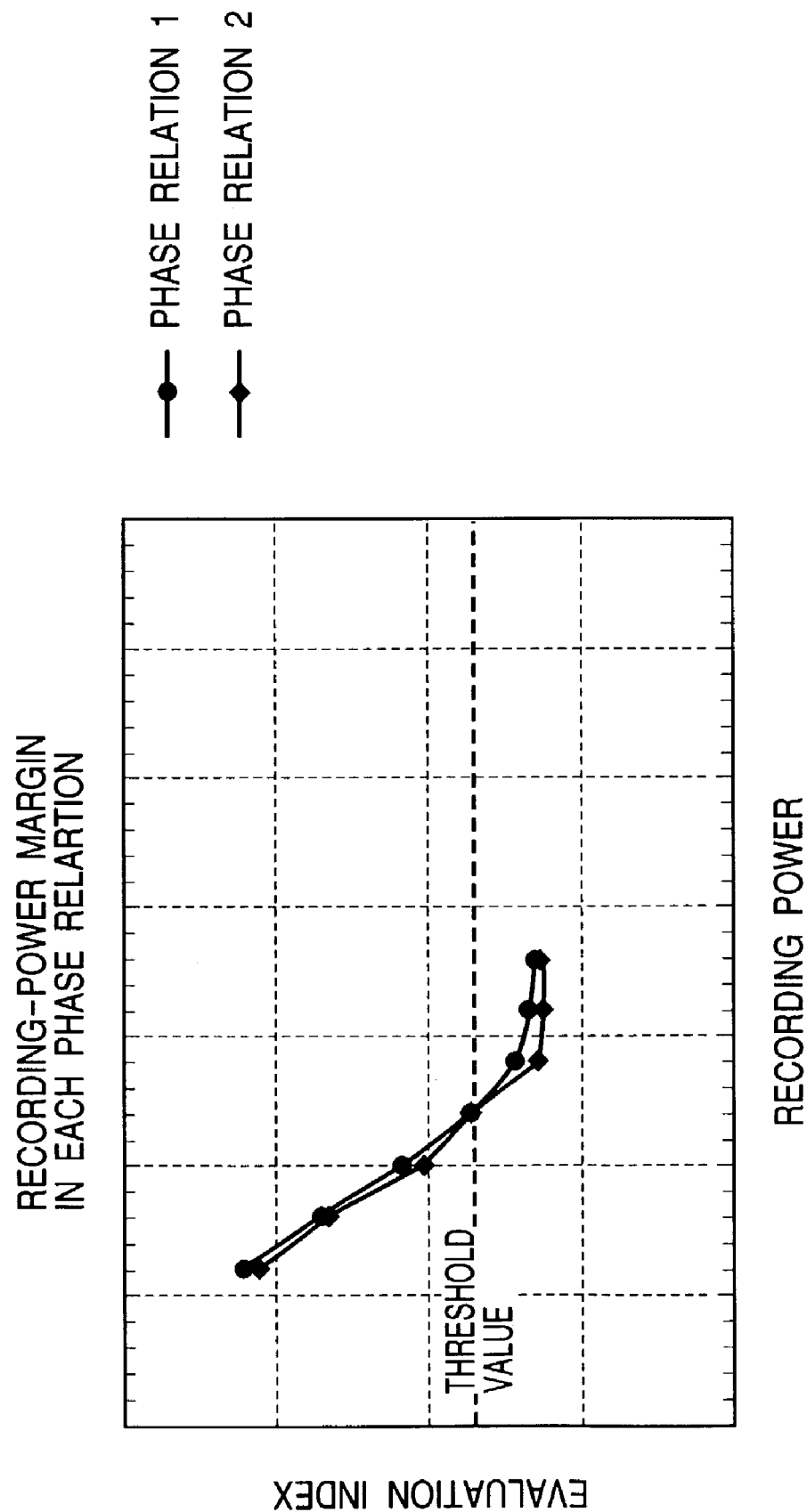

MAGNETO-OPTICAL RECORDING DEVICE CAPABLE OF SETTING THE TIME PHASE OF LASER PULSES AND MAGNETIC FIELDS

BACKGROUND OF THE INVENTION

1. Field of the Invention

The present invention relates to the so-called pulse-assisted magnetic-field-modulation-recording-system magneto-optical recording method and apparatus for recording information by applying a modulation magnetic field corresponding to the information by a magnetic head while irradiating a magneto-optical recording medium with a laser beam emitted like a pulse.

2. Related Background Art

In the case of a magnetic-field-modulation magneto-optical recording apparatus, information is recorded in a magneto-optical disk by arranging an optical head and a magnetic head so as to interpose the magneto-optical disk between the heads and applying a magnetic field whose polarities are reversed in accordance with a recording signal generated by the magnetic head to the magneto-optical disk while irradiating the magneto-optical disk with a laser beam emitted from the optical head.

The magnetic-field-modulation recording system is roughly divided into two types. One of the types is a DC-magnetic-field-modulation recording system for recording data by DC-emitting a laser beam and applying a magnetic field to be modulated corresponding to a recording signal to a magneto-optical recording medium from a magnetic head, and the other one of them is the so-called pulse-assisted magnetic-field-modulation recording system for recording data by emitting a laser beam like a pulse to optimize a temperature rise and a temperature distribution and applying a magnetic field to be modulated corresponding to a recording signal to a magneto-optical recording medium from a magnetic head. The latter system is recently noticed because the S/N of a reproduction signal can be further improved.

In this case, polarities of a magnetic field generated by a magnetic head are changed at the timing at which record data is modulated.

In the case of an optical head, however, the light-emitting period and light-emitting phase are controlled synchronously with a clock signal whose pulse width is set to a value smaller than the modulation period of a magnetic field generated by a magnetic head. In the case of the pulse-assisted magnetic-field-modulation recording, a phase relation between a laser pulse and a modulation magnetic field generated by a magnetic head is important and the laser pulse and modulation magnetic field greatly influence a signal quality. Moreover, to realize a high density and a high speed, the change speed (hereafter referred to as "switching speed") of magnetic-field polarities of a modulation magnetic field is important.

The pulse-assisted magnetic-field-modulation recording is a recording system in which a pulse laser beam is irradiated to a magneto-optical recording medium, the magneto-optical recording medium is raised in temperature, magnetization is decided corresponding to the polarity of an applied magnetic field while the temperature of the magneto-optical recording medium is lowered, and a recording mark is formed. During the temperature lowering, if an applied magnetic field expands to the switching region of a modulation magnetic field and a magnetic field is not applied at a sufficient intensity, the quality of a reproduction signal is extremely deteriorated. Therefore, in the case of a magneto-optical recording apparatus, the laser-beam irradiation timing to the change timing of polarities of a magnetic field generated by a magnetic head is set to a timing at which optimum recording can be performed. For example, it is disclosed in Japanese Patent Application Laid-Open No. 2000-40273 to record a test signal in a recording medium by changing time phases of a laser pulse and a modulation magnetic field for a predetermined recording power, quantify the quality of a reproduction signal obtained from the test signal, and set a time phase corresponding to a test signal whose quality for reproduction is the best as an optimum phase.

A request for further improving the recording density of a magneto-optical recording medium to realize a large capacity has been raised in recent years and it is requested to decrease the pitch between recording tracks and downsize a recording mark.

Downsizing of a recording mark can be settled by accelerating a modulation magnetic field. At the same time, however, there is a problem that it is difficult to secure a sufficient phase margin and thereby, the quality of a reproduction signal is deteriorated. This point is described below in detail.

As shown in FIG. 4, the period Tw-Ts obtained by subtracting a modulation-magnetic-field polarity change speed (hereafter referred to as modulation-magnetic-field switching speed) Ts from a laser-pulse modulation cycle Tw serves as a substantial relative phase margin between a laser pulse and a modulation magnetic field. For example, when the modulation cycle Tw is set to 25 ns and the modulation-magnetic-field switching speed Ts is set to 15 ns, the phase margin between the laser pulse and modulation magnetic field becomes approx. 10 ns. Moreover, when raising a modulation-magnetic-field frequency in order to increase a density and speed, the period in which a magnetic-field intensity is saturated decreases and the phase margin between the laser pulse and modulation magnetic field is further decreased.

Furthermore, as shown in FIG. 5, when the recording power changes, the phase relation between the laser pulse and modulation magnetic field is also changed by changing a raised temperature and temperature distribution and further changing a magnetic-domain forming position. The same is also applied to a case in which not a recording power but a medium temperature is changed. Therefore, the phase margin 10 ns in the above example is further decreased.

When the above phase margin cannot be sufficiently secured, a phase shift exceeding the phase margin between a laser pulse and a modulation magnetic field may almost certainly occur due to a phase shift caused by the fluctuation of electrical components constituting an apparatus, a phase shift caused by the temperature characteristic of an electric system, or a phase shift caused due to environmental change such as temperature and thereby a signal quality is deteriorated.

The technique disclosed in Japanese Patent Application Laid-Open No. 2000-40273 makes it possible to set a time phase securing a sufficient phase margin with respect to a predetermined recording power. However, the recording-power dependency or cross-write characteristic of a recording medium is not considered at all. Therefore, a signal quality is deteriorated because the phase relation is changed due to the fluctuation of a medium temperature or change of recording powers.

SUMMARY OF THE INVENTION

The present invention has been made to solve the above problems and its object is to provide a magneto-optical recording method and apparatus for recording information in which, even when a recording power or medium temperature fluctuates, a sufficient phase margin can be secured to obtain a reproduction signal having a preferable quality.

A magneto-optical recording method of the present invention is a magneto-optical recording method of applying a modulation magnetic field corresponding to information by a magnetic head while irradiating a magneto-optical recording medium with a laser beam emitted like a pulse, and recording the information, comprising:

a step of recording a test signal while changing a recording power and time phases of a laser pulse and a modulation magnetic field;

a step of reproducing the recorded signal and evaluating the quality of the reproduced signal by using a predetermined evaluation index; and a step of setting time phases of a laser pulse and a modulation magnetic field to a value of a time phase of maximizing a recording power margin in accordance with the evaluation result.

Moreover, a magneto-optical recording apparatus of the present invention is a magneto-optical recording apparatus for recording information by applying a modulation magnetic field corresponding to information by a magnetic head while irradiating a magneto-optical recording medium with a laser beam emitted like a pulse, comprising:

means for recording a test signal while changing a recording power and the time phases of a laser pulse and a modulation magnetic field;

means for reproducing the recorded test signal and evaluating the quality of the reproduced signal by using a predetermined evaluation index; and means for setting time phases of a laser pulse and a modulation magnetic field to a value of a time phase of maximizing a recording power margin in accordance with the evaluation result.

BRIEF DESCRIPTION OF THE DRAWINGS

FIG. 13 is an illustration showing a relation between a recording power and an evaluation index in the third embodiment; and FIG. 14 is another illustration showing a relation between a recording power and an evaluation index in the second embodiment.

DETAILED DESCRIPTION OF THE PREFERRED EMBODIMENTS (First Embodiment)

Figure 1:
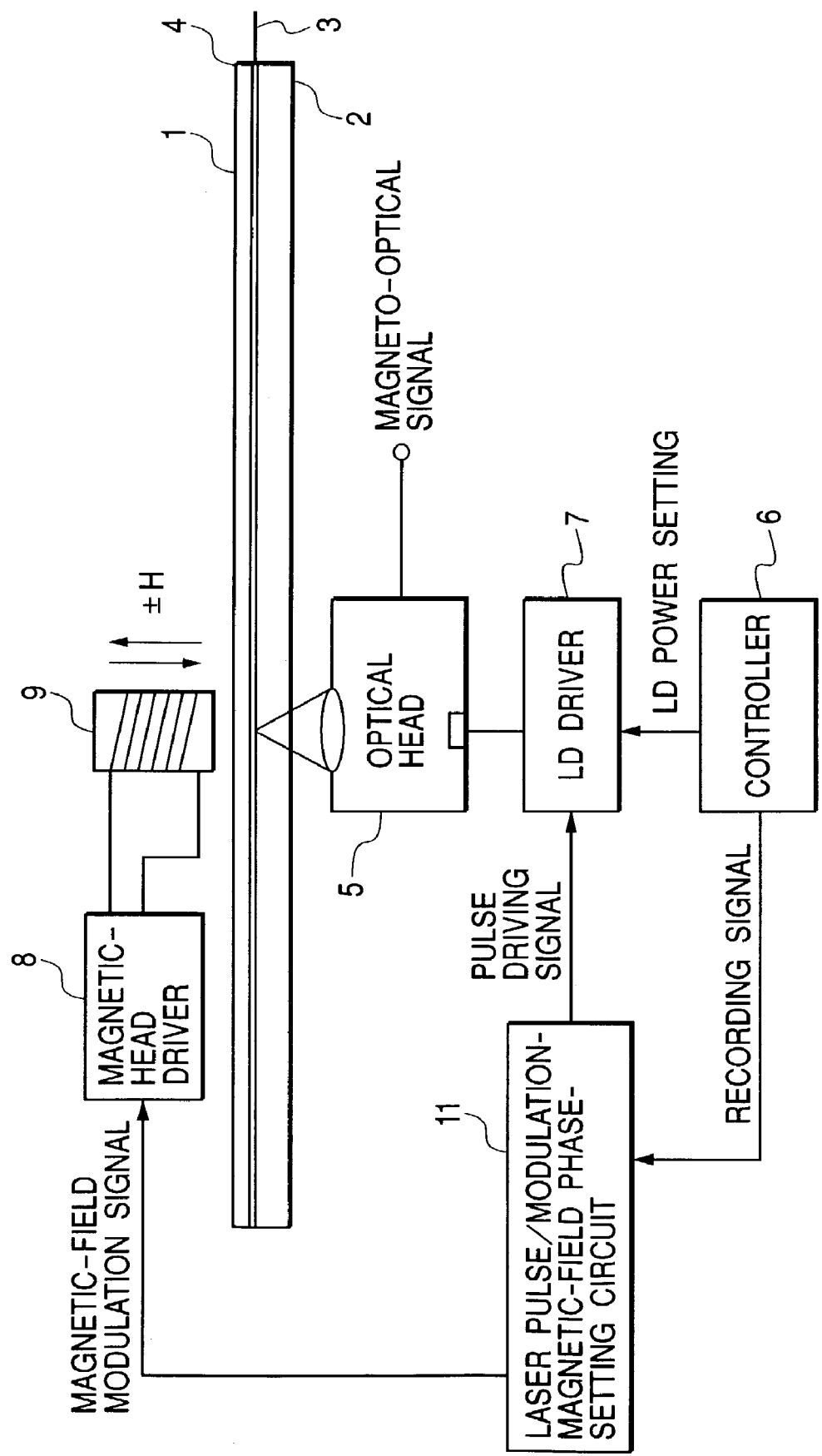
FIG. 1 is a block diagram showing a magneto-optical recording apparatus of the present invention.

FIG. 1 shows a configuration of a magneto-optical recording apparatus of the present invention. In FIG. 1, reference numeral 1 denotes a magneto-optical disk obtained by adhering a magneto-optical recording medium 3 to a substrate 2 made of glass or plastic and moreover forming a protective film 4 on the medium 3. The magneto-optical disk 1 is supported by a spindle motor with a magnet chucking or the like so as to be rotatable about a rotational axis. Reference numeral 5 denotes schematically an optical head for irradiating the magneto-optical disk 1 with a laser beam and obtaining information from reflected light, which is constituted by a condenser lens (ex. NA:0.60), actuator for driving the condenser lens, semiconductor laser (ex. $\lambda$:650 nm), beam splitter, and polarization beam splitter. A laser beam emitted from the semiconductor laser is applied to the magneto-optical disk 1 through an optical-component group. In this case, the condenser lens is controlled by the actuator so as to move in the focusing direction and the tracking direction and sequentially focus on the magneto-optical recording medium 3 and track along a guide groove formed on the magneto-optical disk. The laser beam reflected from the magneto-optical disk 1 is condensed by each sensor in accordance with the difference of a deflected direction corresponding to the polarity of a magnetized magneto-optical recording medium through the optical-component group to output a magneto-optical signal by differentially amplifying the sensors. A controller 6 outputs a recording power and recording signal by using the number of revolutions, recording radius, and recording sector information of a magneto-optical disk and environmental temperature as input information to control an LD driver 7 and magnetic-head driver 8.

Reference numeral 9 denotes a magnetic head for applying a modulation magnetic field to a laser-irradiating portion of a magneto-optical disk when recording is performed, the magnetic head is set at one side of the magneto-optical disk 1 so as to oppose the optical head 5 at the other side of the magneto-optical disk 1. When pulse-emitting a recording laser beam from the optical head 5, the magnetic head 9 simultaneously generates magnetic fields different from each other in polarity corresponding to a recording signal by a magnetic-field modulation driver 8. Moreover, the magnetic head 9 moves in the radius direction of the magneto-optical disk 1 by interlocking with the optical head 5 and records information by sequentially applying a magnetic field to a laser-irradiating portion of the magneto-optical recording medium 3 at the time of recording.

The controller 6 also has a function for controlling a recording sequence and a recording power and moreover, a function for arithmetically analyzing an evaluation index for determining the quality of a signal.

Figure 3A:
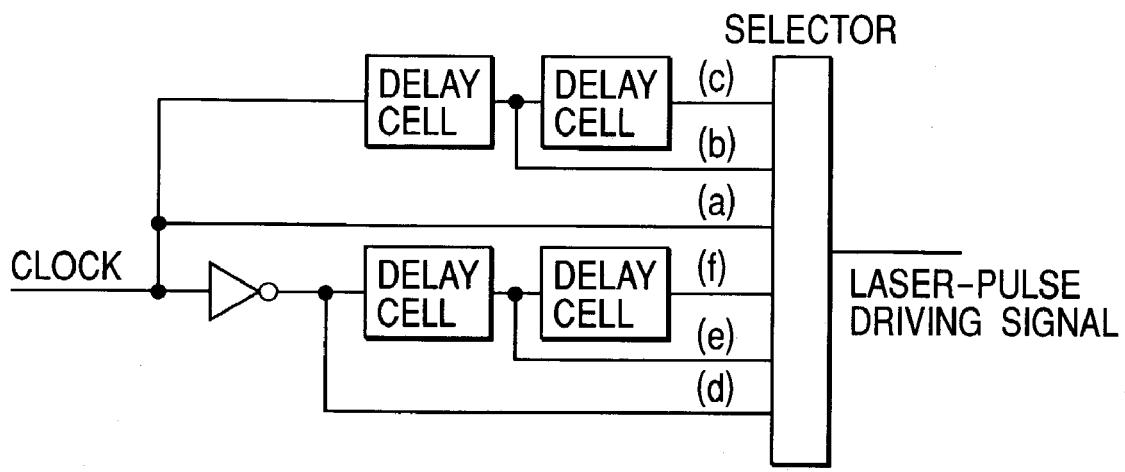
FIGS. 3A and 3B are illustrations showing details of the laser-pulse/modulation-magnetic-field phase setting circuit.
Figure 3B:
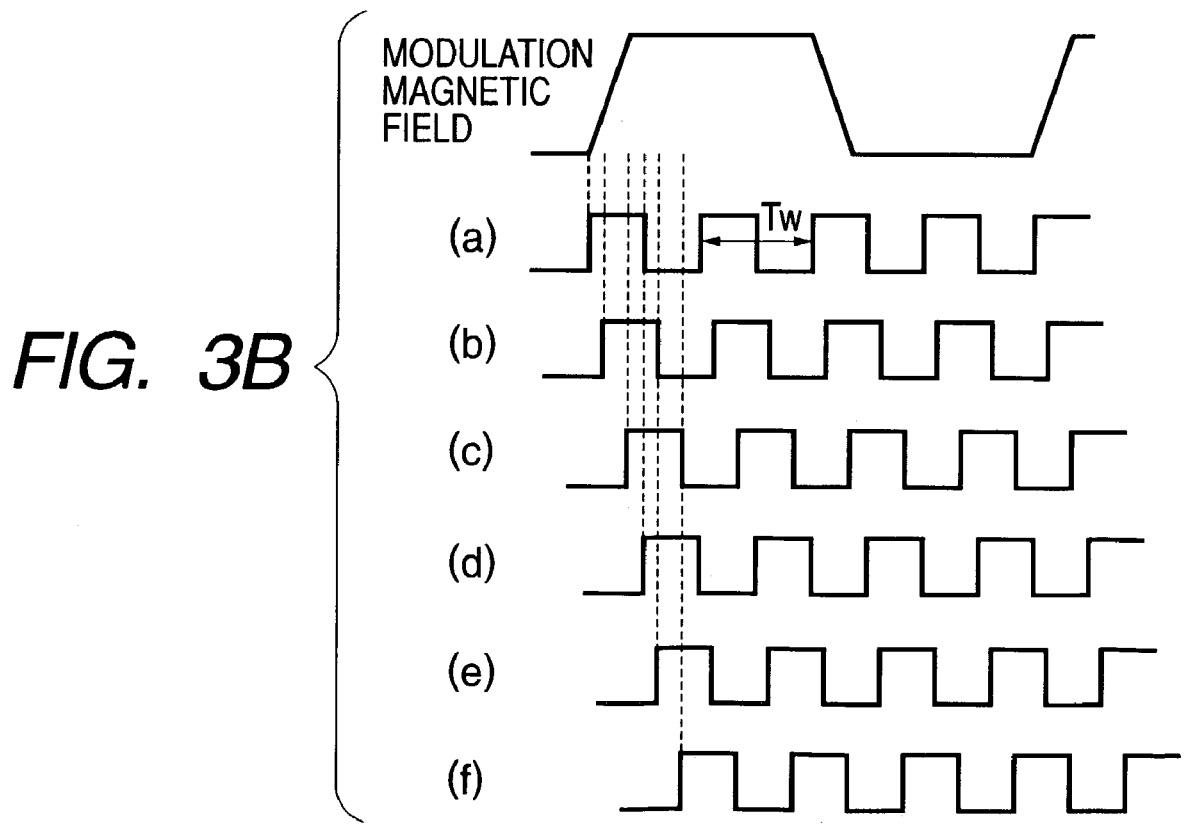
Figure 4:
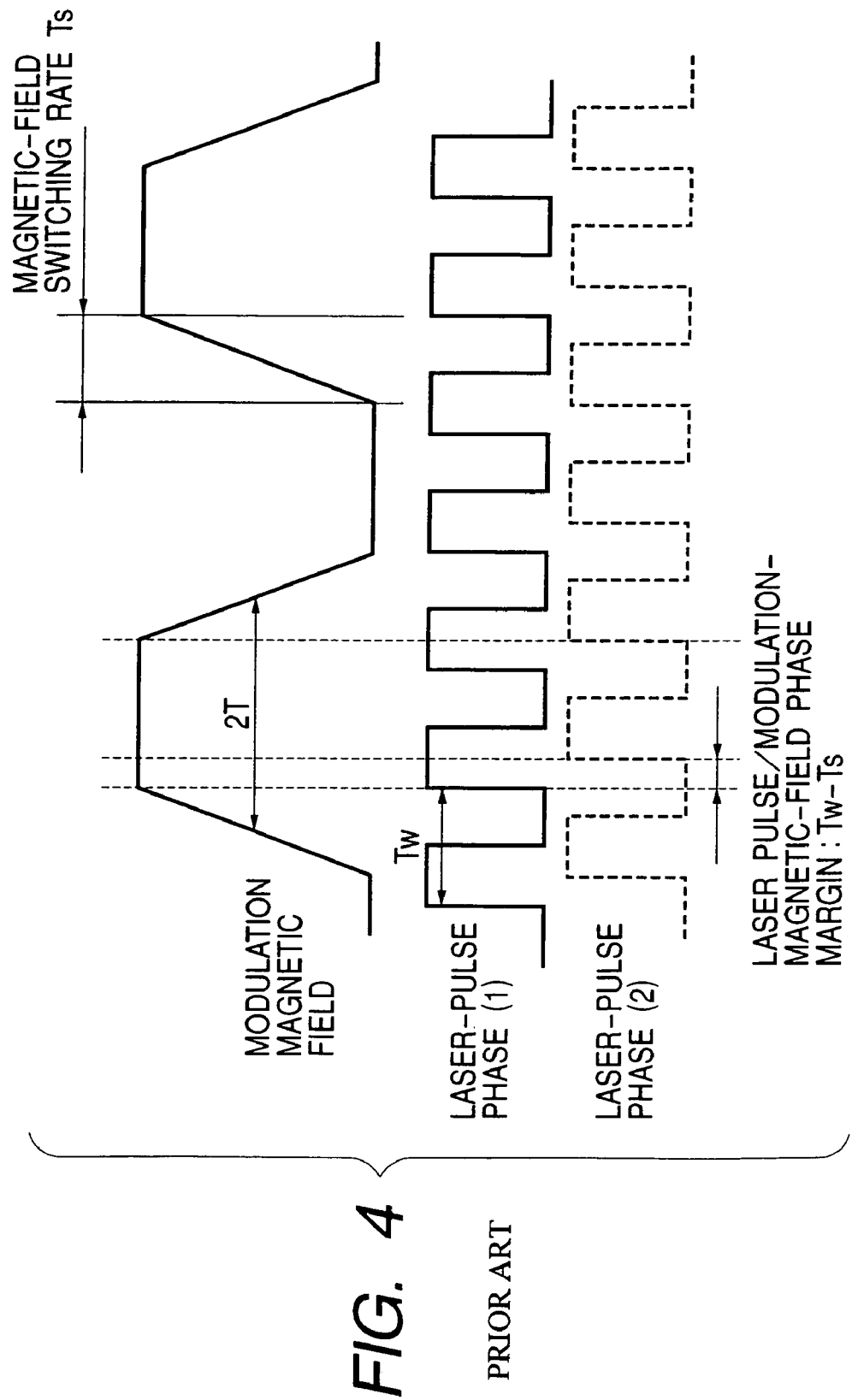
FIG. 4 is an illustration for explaining the phase margin of a laser pulse/modulation magnetic field.

A laser-pulse/modulation-magnetic-field-phase setting circuit 10 changes the relative phase relation between the phase of a pulse laser beam for performing pulse irradiation and a modulation magnetic phase, which is mainly constituted by a delay-value selection circuit composed of a delay line and a selection circuit, as shown by an example in FIG. 3A. This example is constituted so as to change driving phases of a laser pulse and change phases of the laser pulse from (a) to (f) with respect to a modulation magnetic field, as shown in FIG. 3B. The selection control of the laser-pulse/modulation-magnetic-field-phase setting circuit 10 is performed by the controller 6. The laser-pulse/modulation-magnetic-field-phase setting 10 makes it possible to select and change the phase relation between a laser pulse beam to be irradiated to the surface of a magneto-optical recording medium and a modulation magnetic field to be applied to the surface of a magneto-optical recording medium.

Figure 2:
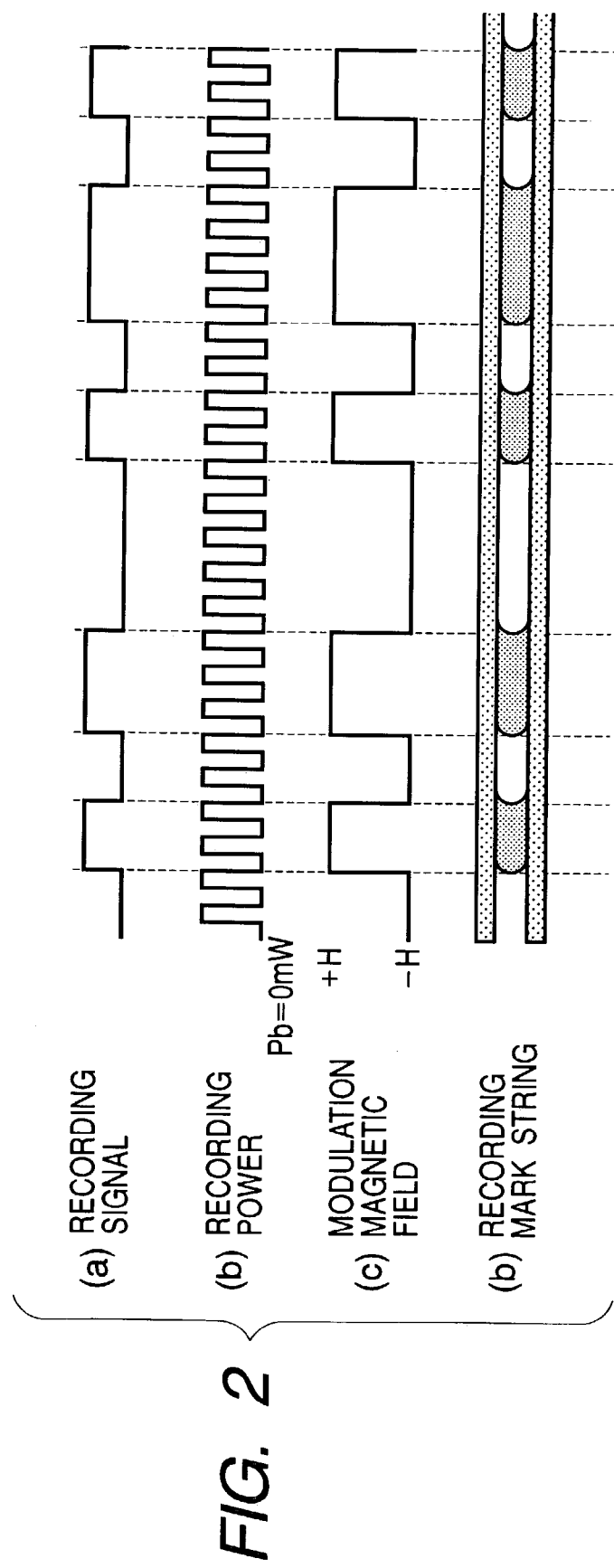
FIG. 2 is a timing chart for explaining basic recording operations of the present invention.

Basic recording operations of a magneto-optical recording medium of the present invention are described below by referring to FIG. 2. In FIG. 2, reference character (a) denotes a recording signal, (b) denotes a pulse-modulation laser beam, (c) denotes a modulation magnetic field, and (d) denotes a recoding-mark string. When recording the recording signal shown by (a), on starting the recording operation a laser power is set to a predetermined recording power as shown by (b) and modulated like a pulse, and at the same time the modulation magnetic field (c) based on the recording signal (a) is applied. In this case, the bottom power of the modulation laser beam is set to "zero." However, the bottom power is not restricted to "zero" but it may be set to a value other than. "zero." Moreover, this embodiment is described by assuming that the modulation frequency of a laser beam is equal to a data clock frequency serving as the reference of a data processing operation for generating recording data. However, the modulation frequency is not restricted to the data clock frequency. It is also allowed that the modulation frequency is equal to an integral multiple of the data clock frequency. Moreover, though pulse irradiation is expressed by a duty of 50% in the case of this embodiment, it is not restricted to a duty of 50%. It is possible to use various duties. Then, the recording mark string (d) is formed while a magneto-optical recording medium is cooled by these recording operations. This is the so-called pulse-assisted magnetic-field modulation recording. The hatched portion and netted portion show magnetic domains having magnetizing directions opposite to each other.

In the case of this embodiment, a test signal is recorded in a dedicated recording test region. However, it is not always necessary to form the recording test region over the circumference of a disk.

Figure 6:
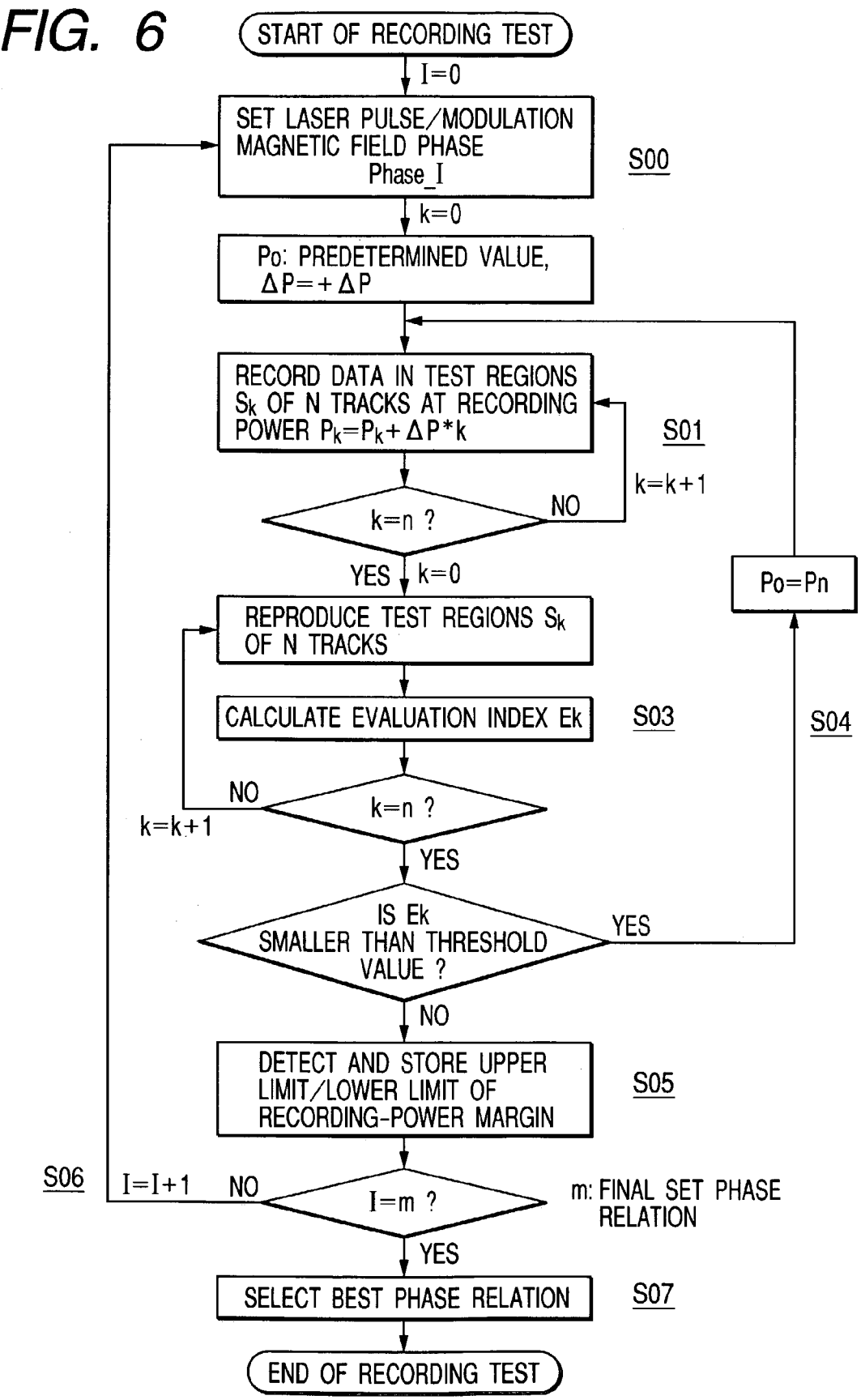
FIG. 6 is an illustration showing an operation flow of a first embodiment of the present invention.

A magneto-optical recording method of the present invention is described below in accordance with the flowchart shown in FIG. 6.

First, before actually starting recording, a phase Phase_I of a laser pulse and a modulation magnetic field is set by the laser-pulse/modulation-magnetic-field-phase setting circuit 10. (S01)

Though an initial set value is not restricted, when the phase relation between a laser pulse and a modulation magnetic field previously set according to the present invention is stored in a memory, this value may be used as an initial value.

Then, a predetermined recording pattern is recorded in track N of the recording test region. The recording pattern is not restricted. It is allowed to use a recording pattern suitable for an evaluation index for evaluating the quality of a reproduction signal. Jitter, SAM (Sequenced Amplitude Margin), error rate or the like is considered as an evaluation index. Moreover, a recording power margin is determined in a recording power range of not more than a threshold value set in accordance with the relation between an adopted evaluation index and an error rate, that is, in the recording power range in which a preferable error rate can be taken.

For a laser power for recording data in the track N, it is allowed to set a laser power Po standardized for an apparatus as an initial value. Recording is performed by increasing the laser power Po by $\Delta P*n$ (n: natural number).

It is allowed to set a minimum unit necessary for an evaluation index to a recording region for changing and recording the above recording laser power. In this case, it is assumed that a disk is divided from So up to Sn in predetermined recording region units in the circumferential direction and the setting of a recording power is changed in the recording region units.

First, recording is performed in the recording region Sk ($0 \leq k \leq n$) on the track N with the recording power set by $Pk=Po+\Delta P*k$. (S-01)

Then, the track N is reproduced for the recording magnetic domain string in which recording is performed in accordance with the above described method to evaluate the quality of a signal in accordance with an evaluation index. (S-03)

Moreover, when a recording power does not exceed the threshold value of the evaluation index even by increasing the recording power up to Pn, it is allowed to repeat the same recording test by setting the initial value Po to $Po+\Delta P*n$. (S-04) As described above, the upper and lower limits of a recording power margin to the phase Phase_I of a set laser-pulse/modulation magnetic field or the central value of the margin are detected and stored in a memory. (S-05)

In this case, the central value denotes an optimum recording power but it is not restricted.

The above sequences of (S-01) to (S-05) are repeated by changing the phase (Phase_I) of the laser pulse/modulation magnetic field (S-06) to detect upper and lower limits and central value of each recording power at each phase. When measurement of the recording power margin at each phase is completed, a phase of maximizing the recording power margin is selected as the time phase of an optimum laser pulse/modulation magnetic field. (S07)

Figure 7:
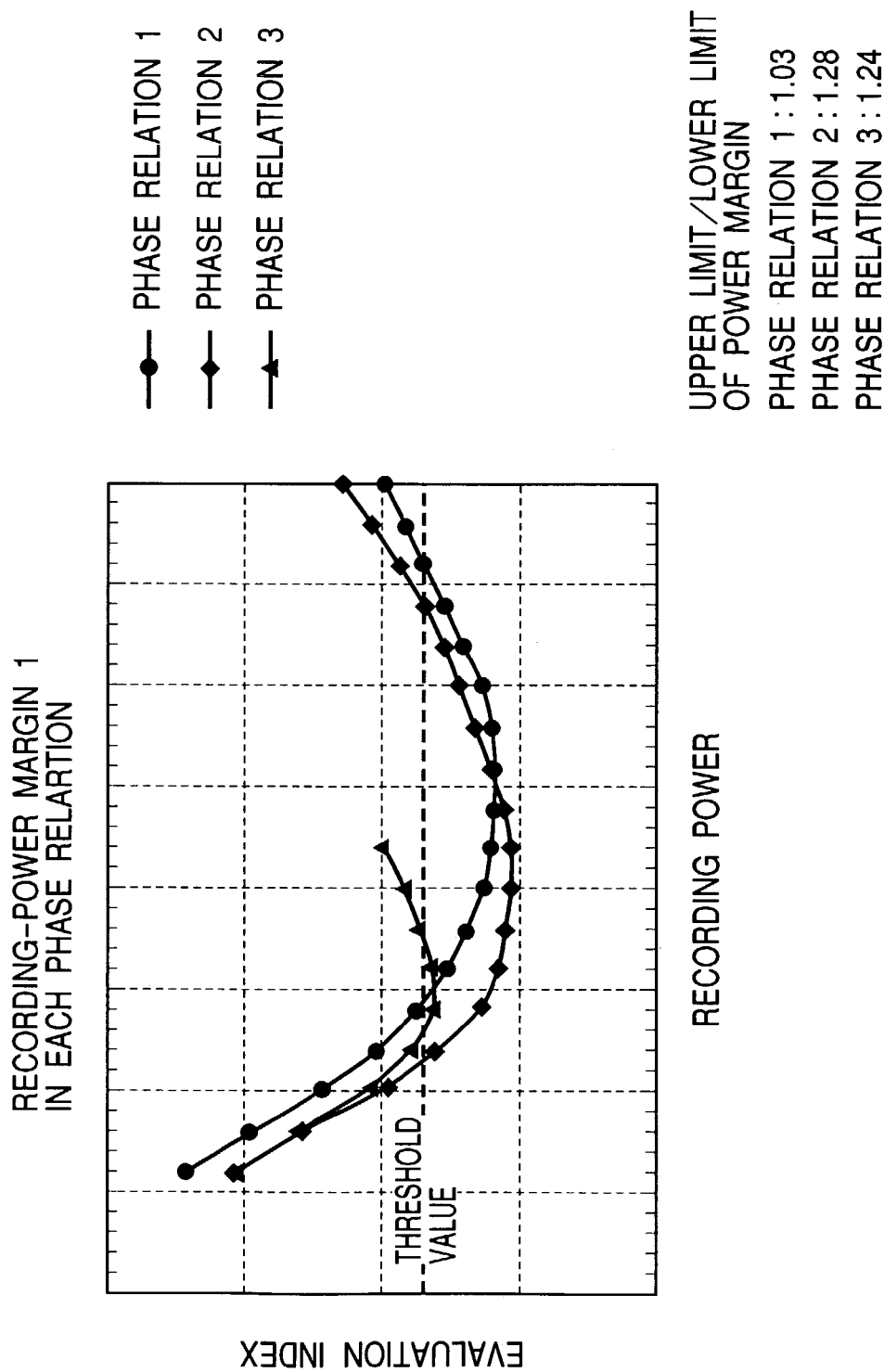
FIG. 7 is an illustration showing a relation between a recording power and an evaluation index in the first embodiment.

FIG. 7 shows results of measuring recording-power margins when changing three types of phases. In FIG. 7, the axis of abscissa denotes a recording power, the axis of coordinate denotes an evaluation-index value, and a broken line denotes the threshold value of an evaluation index. This embodiment uses an error rate as an evaluation index.

The phase of a laser pulse/modulation magnetic field in which a recording-power margin becomes widest is selected by repeating the above measurement to use the phase to record the information on user data. Because an optimum recording power when recording the user data is estimated as almost the median of the selected recording-power margin, the optimum recording power is set to the median of the recording power margin stored in a memory.

According to the above method, it is possible to secure a preferable phase relation even if a recording power or medium temperature fluctuates, it is unnecessary to severely control the recording power or medium temperature, and it is possible to simplify an apparatus and improve a reliability.

(Second Embodiment)

Because a configuration of a magneto-optical recoding apparatus used for the second embodiment is the same as that as shown in FIG. 1, the configuration is described by referring to FIG. 1.

In the case of this embodiment, a test signal is recorded in a dedicated recording-test region. However, the second embodiment is different from the first embodiment in that a test signal is also recorded in adjacent tracks. It is not always necessary to form a recording test region over the circumference of a disk. However, it is necessary that the region is formed over three or more tracks.

Figure 8:
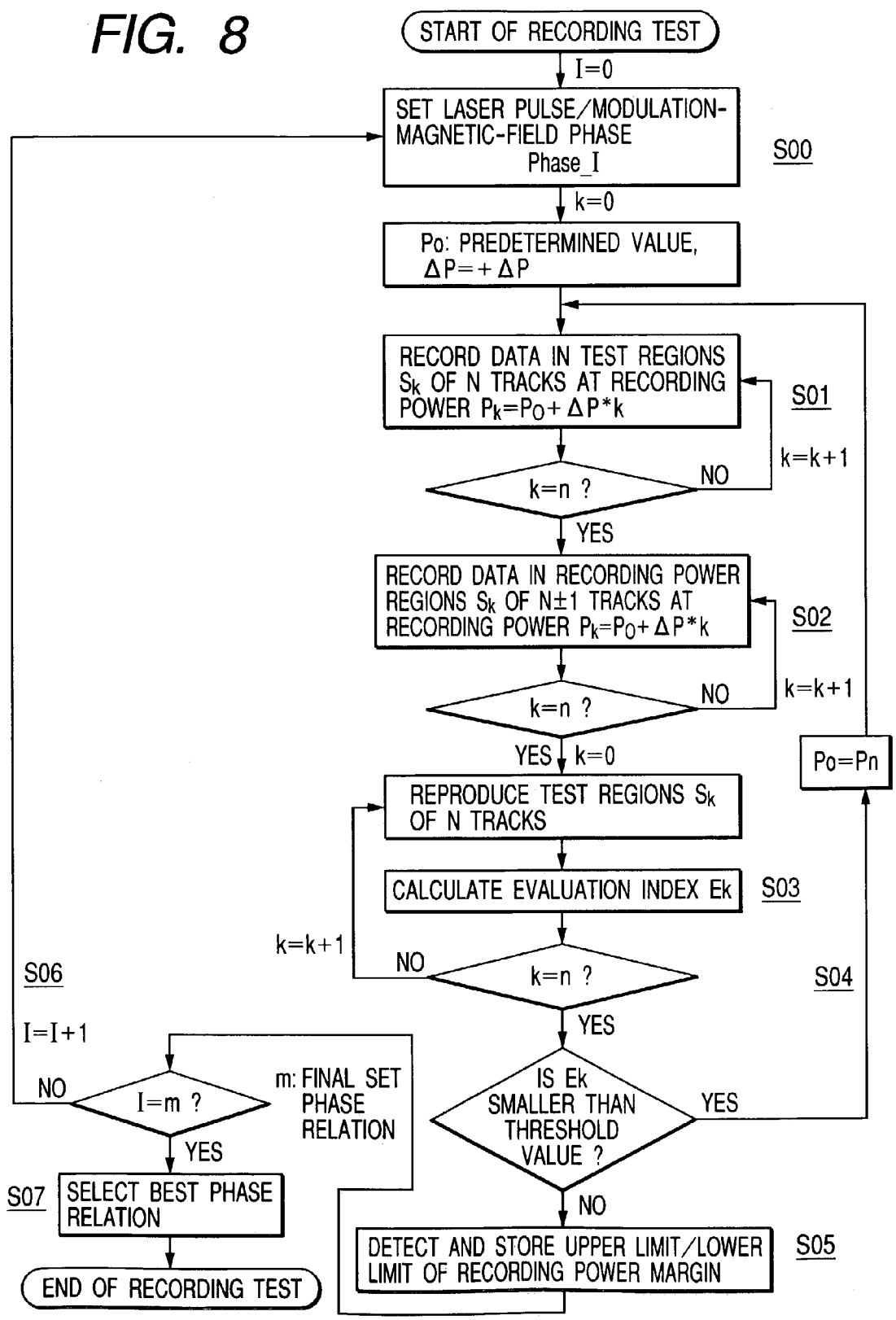
FIG. 8 is an illustration showing an operation flow of a second embodiment of the present invention.

Hereafter, description is made along the flowchart shown in FIG. 8.

First, before actually performing recording, the phase Phase_I of a laser pulse and a modulation magnetic field is set by the laser-pulse/modulation-magnetic-field-phase setting circuit 10. (S00)

Though an initial set value is not restricted, when the phase relation is previously stored in a memory in accordance with a technique of the present invention, this may be used as the initial set value.

Then, a predetermined recording pattern is recorded in the track N of a recording test region. Because a recording pattern is not restricted, it is allowed to use a recording pattern suited to evaluate the quality of a reproduction signal. Jitter, SAM (Sequenced Amplitude Margin), error rate or the like is considered as an evaluation index. Moreover, a recording power margin is determined in a recording power range of not more than a threshold value set in accordance with the relation between an adopted evaluation index and error rate. Moreover, a predetermined recording pattern is recorded in tracks N−1 and N+1 at the same recording power.

In this case, though the recording pattern is not restricted similarly to the case of the track N, it is more preferable to avoid the peculiar same state as the case of the track N.

In the case of a laser power for recording data in tracks N, N−1 and N+1, it is allowed to set a laser power Po standardized for an apparatus as an initial value. The laser power is increased by $\Delta P*n$ (n: natural number) for the laser power Po and recorded.

It is allowed to set a minimum unit necessary for an evaluation index to a recording region in which the above recording laser power is recorded by changing it. In this case, it is assumed that a disk is divided from $S_o$ to $S_n$ in predetermined recording region units in the circumferential direction and the setting of the recording power is changed in the recording region units.

Then, steps in and after (S01) are described below in detail.

First, recording is performed in a recording region Sk ($0 \leq k \leq n$) of the N track at the recording power set by $Pk=Po+\Delta P*k$. Then, recording is performed in recording regions Sk ($0 \leq k \leq n$) of the tracks N−1 and N+1 adjacent at the recording power set by the above recording power $Pk=Po+\Delta P*k$. It is a matter of course that each of the tracks N, N−1, and N+1 is less than one track because of the characteristic of a cross write test. Therefore, it is necessary to decide n by considering the above mentioned point. (S01, S02)

Then, the track N is reproduced for the recording-magnetic-domain string in which recording is performed in accordance with the above described method to evaluate the quality of a signal in accordance with an evaluation index. (S03)

Moreover, when the recording power does not exceed the threshold value of an evaluation index even after increasing the power up to Pn, it is allowed to repeat the same recording test by setting an initial value to $Po=Po+\Delta P*n$. (S04)

As described above, the upper and lower limits and median of a recording-power margin are detected for the phase of the set laser pulse/modulation magnetic field and stored in a memory. (S05)

In this case, the median denotes an optimum recording power. However, an optimum recording power is not restricted to a median.

The above sequences (S01) to (S05) are repeated by changing phases of a laser pulse/modulation magnetic field (S06) to detect the recording power margin at each phase. When measurement of the recording power margin at each phase is completed, a phase of maximizing a recording power margin is selected as the phase of the laser pulse/modulation magnetic field. (S07)

Figure 9:
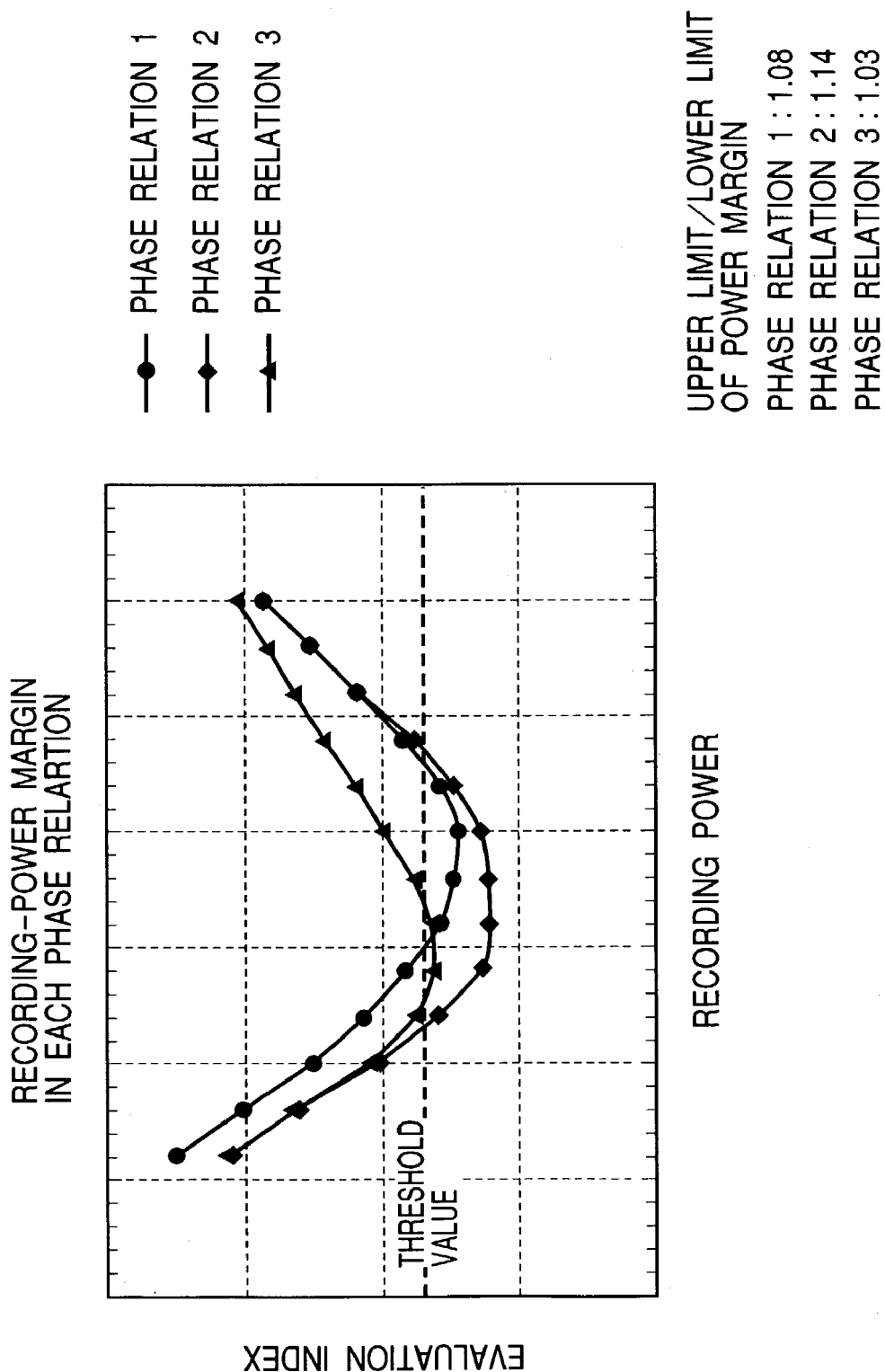
FIG. 9 is an illustration showing a relation between a recording power and an evaluation index in the second embodiment.

FIG. 9 shows results of measuring recording power margins when changing three types of phases in the same manners as in the case of the first embodiment. In FIG. 9, the axis of abscissa denotes a recording power, the axis of ordinate denotes an evaluation index, and a broken line denotes a threshold value of an evaluation index. An evaluation index uses an error rate. In the case of this embodiment considering cross write, phase relation 2 has the widest recording-power margin.

Figure 10:
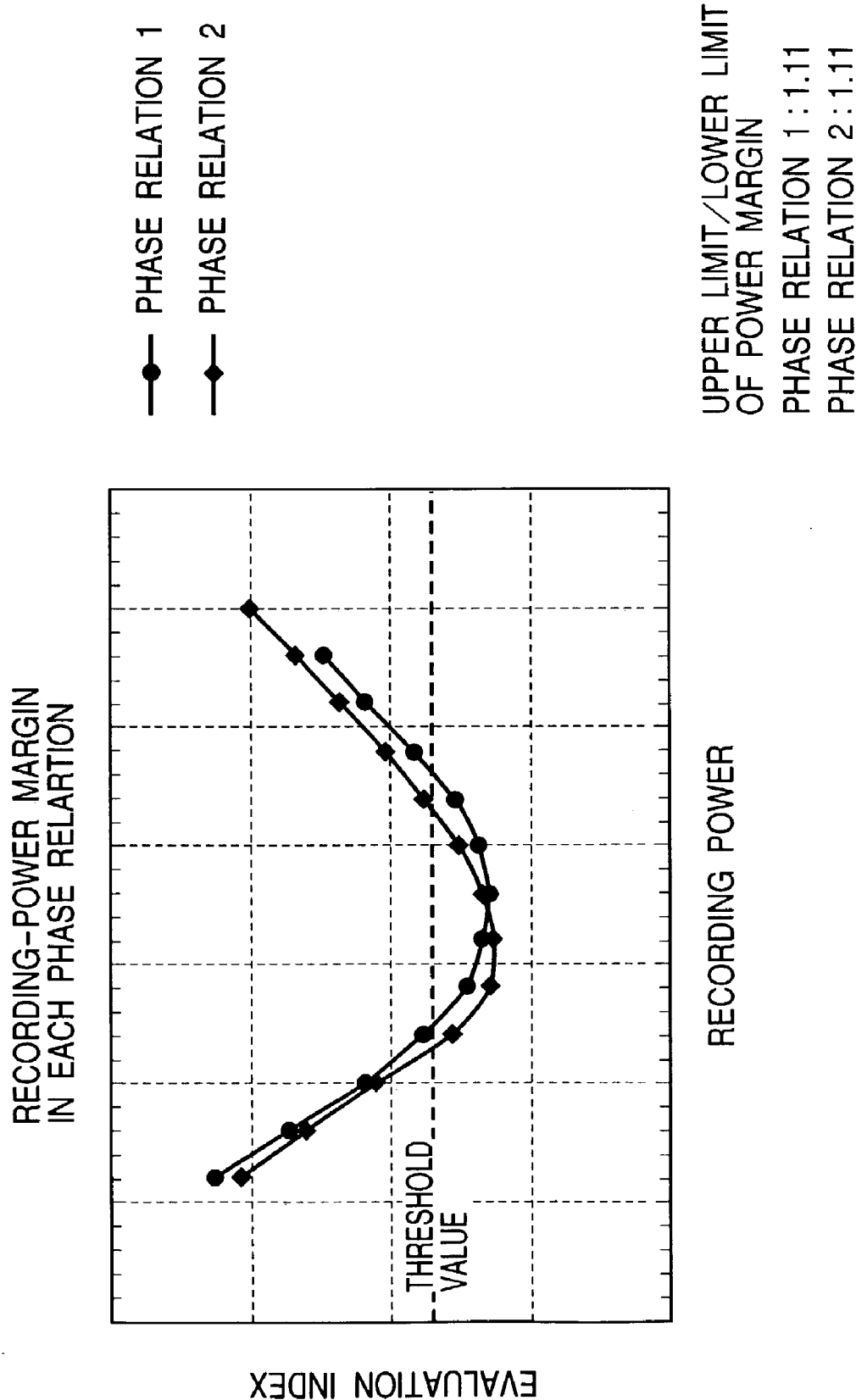
FIG. 10 is another illustration showing a relation between a recording power and an evaluation index in the second embodiment.

In the case of this embodiment, a recording power margin depends on the influence of cross write. Therefore, there is a case where the same recording power margin can be obtained even for different phases as shown in FIG. 10. In this case, a phase is selected by giving priority to the minimum value of a recording power. It is estimated that the upper limit of a recording power is decided in accordance with a cross write factor in the case of this embodiment. The recording-power upper limit due to the cross write factor may be lowered by a track offset or the like from the central position of an information recording track. Therefore, it is preferable that a recording power margin can be secured in a lower recording-power region. Moreover, in the case of the first embodiment, it is not preferable from the viewpoint of the durability of recording repetition in a magneto-optical recording medium to set a recording power to a high value though the upper limit is not changed due to cross write.

Because of these reasons, when recording power margins are equal, the phase of a laser pulse/modulation magnetic field is selected which can take a smaller value of the lower limit of a recording-power margin.

Figure 5:
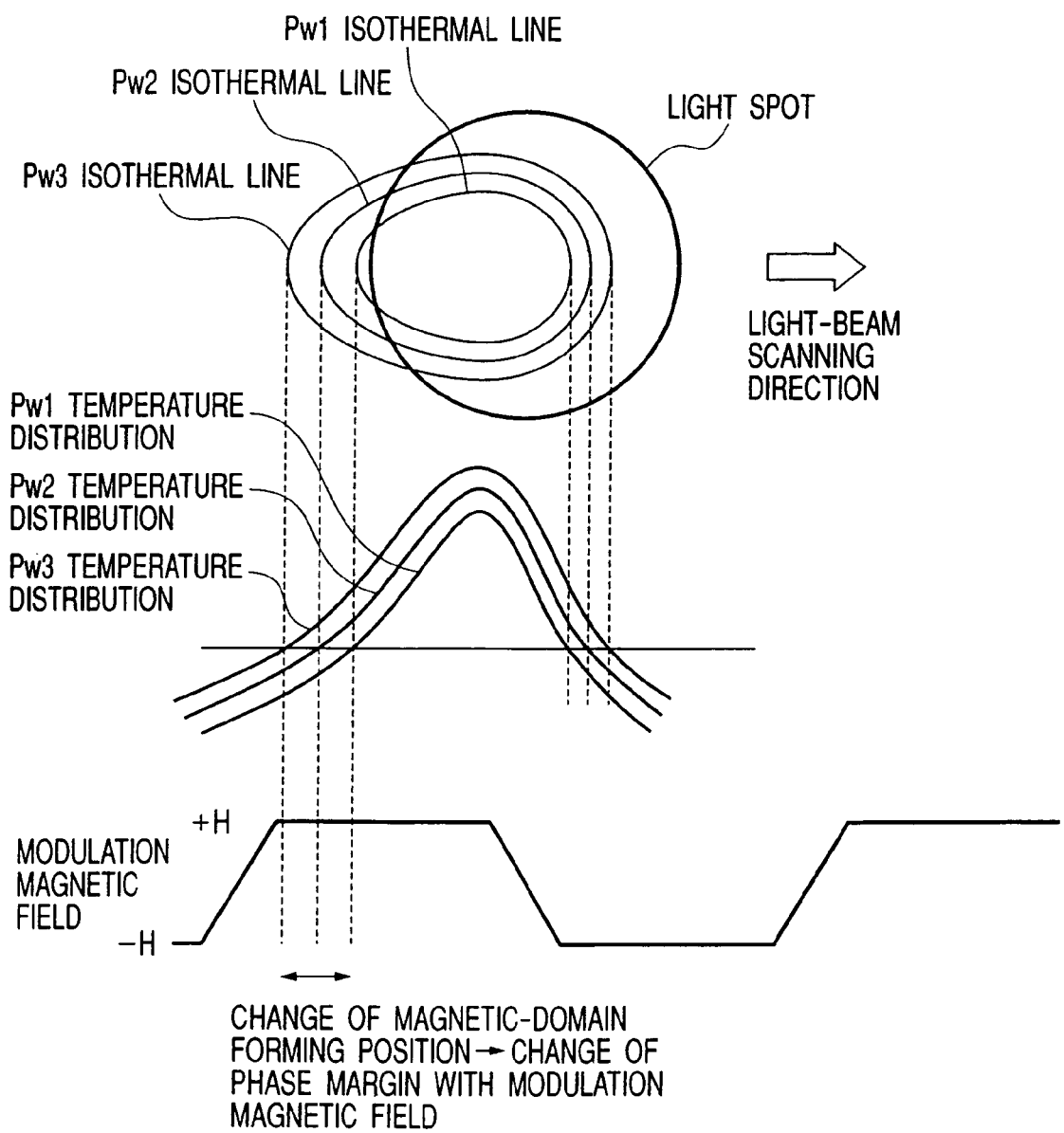
FIG. 5 is an illustration for explaining the correlation of change of temperature distribution with modulation magnetic field at the time of change of a recording power (Pw1, Pw2 and Pw3)
Figure 11:
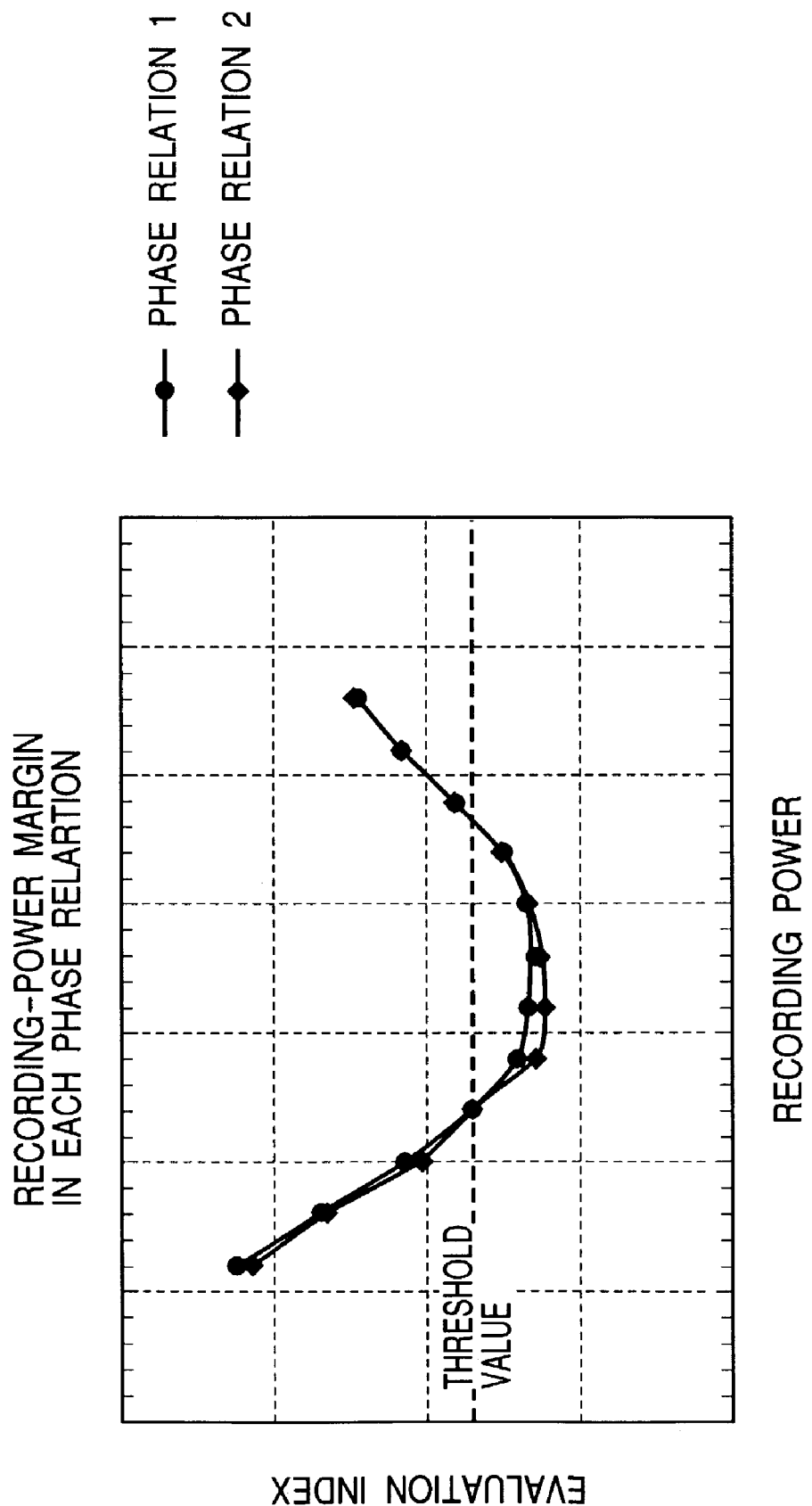
FIG. 11 is still another illustration showing a relation between a recording power and an evaluation index in the second embodiment.

Moreover, as shown in FIG. 11, when a recording power margin and even the lower limit of the recording power margin become the same value, a phase is selected at which the laser-pulse irradiating timing becomes early with respect to a modulation magnetic field. When lower limits of recording power margins are the same, it is preferable to secure in a better state a reproduction-signal characteristic when a recording power becomes higher than the lower limit. When the recording power becomes high, an isothermal line due to irradiation with a laser pulse shifts further backward in the light-beam scanning direction of a magneto-optical recording medium, as shown in FIG. 5, in the case of a temperature distribution under irradiation with the laser pulse. Therefore, to obtain a better reproduction-signal quality at the temperature distribution, a phase at which the laser-pulse irradiating timing becomes early with respect to a modulation magnetic field is more preferable. Because of these reasons, when the lower limits of recording powers of recording power margins have the same value in different phases, a phase at which the laser-pulse irradiating timing becomes early to a modulation magnetic field is selected.

As described above, the phase of a laser pulse/modulation magnetic field is selected and used to record the information on user data. Because an optimum recording power when recording user data is estimated as almost the median of a selected recording power margin, the optimum recording power is set to the median of a recording power margin stored in a memory.

According to this embodiment, it is possible to set a phase relation considering influences of the phase margin of a laser pulse/modulation magnetic field and the recording power margin such as cross write.

It is assumed that the above embodiments are executed by using a predetermined recording test region. Moreover, it is allowed to use an unregistered user data region.

Furthermore, it is allowed to execute the above sequences whenever setting a medium to an apparatus or every predetermined time. Moreover, it is allowed to execute the sequences in one of inspection and adjustment steps when a magneto-optical recording apparatus is shipped from a plant.

(Third Embodiment)

Because a configuration of a magneto-optical recording apparatus used for the third embodiment is the same as that in FIG. 1, the configuration is described by referring to FIG. 1.

In the case of this embodiment, a laser-pulse/modulation-magnetic-field setting sequence is simplified to shorten a test time by considering that the upper limit of a recording power margin is controlled by the cross write characteristic in the case of the second embodiment.

In the case of this embodiment, a test signal is recorded in a dedicated recording-test region. However, it is not always necessary to form the recording test region over the circumference of a disk.

Figure 12:
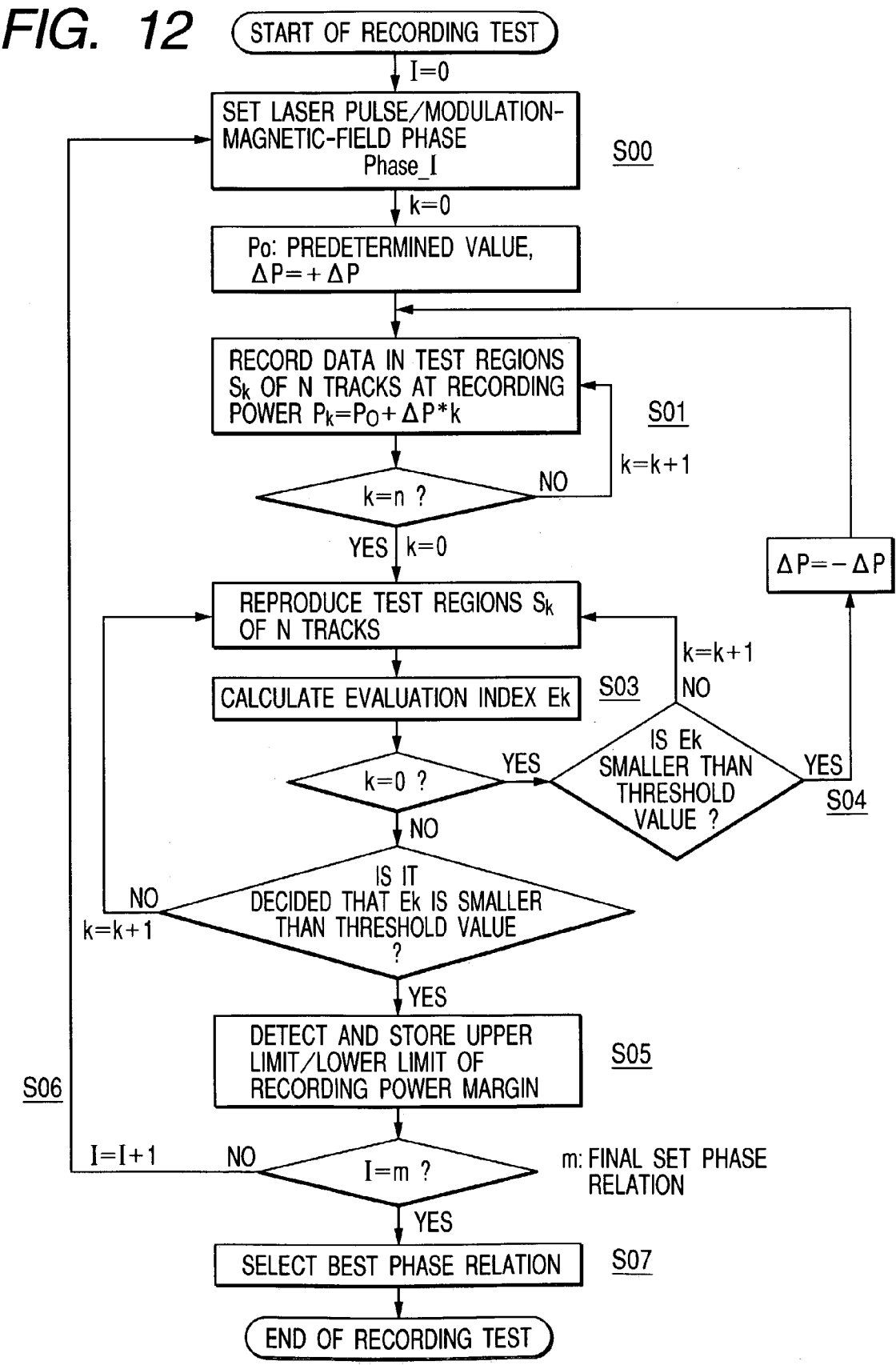
FIG. 12 is an illustration showing an operation flow in a third embodiment of the present invention.

Description is made below along the flowchart shown in FIG. 12.

First, before actually performing recording, the phase Phase_I of a laser pulse and a modulation magnetic phase is set to a laser-pulse/modulation-magnetic-field-phase setting circuit 10. (S00)

Though an initial set value is not restricted, when the phase relation between a laser pulse and a modulation magnetic field previously set by a technique of the present invention is stored in a memory, this may be used.

Then, a predetermined recording pattern is recorded in the track N of the recording test region. A recording pattern is not restricted. It is allowed to use a pattern suited to evaluate the quality of a reproduction signal. Jitter, SAM (Sequenced Amplitude Margin), error rate or the like is considered as an evaluation index. Moreover, a recording power margin is determined in a recording-power range of not more than a threshold value set in accordance with the relation between an adopted evaluation index and error rate.

In the case of this embodiment, only the lower limit of a recording power margin is measured but a recording power is not increased up to a region for measuring the upper limit of the recording power margin due to cross write. Therefore, in the case of this embodiment, it is not necessary to measure two tracks or more and it is possible to decide the phase of a laser pulse/modulation magnetic field by measuring only a track N.

A laser power for recording of the track N can be set by assuming the laser power Po standardized for an apparatus as an initial value. A laser power is increased by $\Delta P*n$ (n is a natural number) with respect to the laser power Po to perform recording.

In the case of this embodiment, when a recording power at the lower-limit side of a recording power margin is clearly detected, measurement of the recording power margin in the phase of the laser pulse/modulation magnetic field at the time is completed, and measurement of the recording power margin at the next phase is started. This is because the upper limit of a recording power margin is controlled by the cross write characteristic when a track pitch is narrowed and the upper limit is decided independently of the phase of the laser pulse/modulation magnetic field. Therefore, to set the phase of the laser pulse/modulation magnetic field, it is unnecessary to measure the upper limit of the recording power margin, it is possible to simplify a sequence for setting the phase of the laser pulse/modulation magnetic field by omitting the above operation and shorten time.

It is allowed to set a minimum unit necessary for an evaluation index to a recording region in which recording is performed by changing the above recording laser power. In this case, it is assumed that a disk is divided from $S_o$ up to $S_n$ in predetermined recording region units in the circumferential direction and the setting of a recording power is changed in the recording region units.

First, recording is performed in the recording region Sk ($0 \leq k \leq n$) of the track N at the recording power set to $Pk=Po+\Delta P*k$. (S01)

Then, the track N is reproduced for a recording magnetic domain string in which recording is performed in accordance with the above described method to evaluate the quality of a reproduction signal in accordance with an evaluation index. (S03)

In the case of this embodiment, when a recording power Pk lower than the threshold value of an evaluation index is detected, the quality of a reproduction signal is evaluated in a recording region in which a recording power is increased by several steps from the above recording power, measurement of a recording power margin is completed when it is confirmed that the recording power Pk is the lower limit of the recording power margin lower than the threshold value, and the lower limit of the recording power margin is detected for the phase of the set laser pulse/modulation magnetic field and stored in a memory. (S04)

When the laser power Po of the initial value is already lower than the threshold value of an evaluation index, evaluation of the quality of the reproduction signal is interrupted, the same recording operation is performed again while decreasing the laser power Po by $\Delta P*n$ (n: natural number), and a recorded signal is reproduced to detect the lower limit of the recording power margin. (S05)

The above sequences (S01) to (S04) are repeated by changing phases of the laser pulse/modulation magnetic field (S06) to detect the lower limit of the recording power margin at each phase. FIG. 13 shows results of measuring recording power margins when changing three types of phases in the same manners as in the case of the second embodiment. In FIG. 13, the axis of abscissa denotes recording power, the axis of ordinate denotes evaluation index, and a broken line denotes the threshold value of an evaluation index. An evaluation index uses an error rate.

Also in the case of this embodiment in which cross write measurement is not performed, the phase relation 2 has the smallest value of the lower limit of a recording power margin and the same result as the case of the second embodiment is obtained for the setting of the phase of the laser pulse/modulation magnetic field. This is because the upper limit of a recording power margin does not depend on the phase of the laser pulse/modulation magnetic field but it is caused by cross write and the lower limit of the recording power margin depends on the phase of the laser pulse/modulation magnetic field.

As shown in FIG. 14, because a phase that can be set unavoidably takes a discrete value from the viewpoint of an apparatus, the same lower limit of the recording power margins may be taken under different phase relations according to circumstances.

In this case, a phase relation in which the laser-pulse irradiating timing becomes early with respect to a modulation magnetic field is selected. When lower limits of recording power margins are the same, it is necessary to secure the reproduction-signal characteristic in a better state when a recording power becomes higher than the lower limits. When the recording power becomes high, an isothermal line shifts further backward in the light-beam scanning direction of a magneto-optical recording medium in the case of a temperature distribution under irradiation with a laser pulse as shown in FIG. 5. Therefore, in this temperature distribution the laser-pulse irradiating timing for obtaining a higher quality of a reproduction signal has a phase in which the timing becomes relatively early with respect to a modulation magnetic field. Because of these reasons, when lower limits of recording power margins take the same value in different phases, a phase in which a laser-pulse irradiating timing becomes early with respect to a modulation magnetic field is selected and set.

According to this embodiment, it is possible to set an optimum phase relation considering recording power margins such as the phase margin of a laser pulse/modulation magnetic field and a cross-write factor only by recording and reproducing of the track N.

It is assumed to execute the above embodiments by using a previously-formed recording test region. Moreover, it is allowed to use an unregistered user data region.

Furthermore, it is allowed to execute the above sequences whenever setting a medium to an apparatus or every predetermined time. Moreover, it is allowed to execute the above sequences in one of inspection and adjustment steps when a magneto-optical recording apparatus is shipped from a plant.

As described above, according to a magneto-optical recording method and apparatus of the present invention, it is possible to most widely set a recording power margin with respect to the problems of the cross write due to decrease of track pitch according to increase of density and the phase margin of a laser pulse/modulation magnetic field in improvement of a high line density and high speed in the case of pulse-assisted magnetic-field modulation recording. That is, it is possible to prevent the quality of a reproduction signal from deteriorating against a change of phase relation due to the fluctuation of a recording power or a medium temperature and secure a preferable signal quality. Moreover, it is possible to prevent the cross write of adjacent tracks at the same time. As a result, it is possible to provide a magneto-optical recording method and apparatus for recording information in which a reproduction signal having a preferable quality can be obtained. Moreover, it is possible to provide a simple and high-reliability magneto-optical recording method and apparatus.

What is claimed is:

1. A magneto-optical recording method of recording information by applying a modulation magnetic field corresponding to information to a magneto-optical recording medium by a magnetic head while irradiating the magneto-optical recording medium with a laser beam emitted like a pulse, comprising:

a step of changing the recording power of a laser pulse while recording test signals on the magneto-optical recording medium and changing the time phases of the laser pulse and a modulation magnetic field while recording the test signals on the magneto-optical recording medium;

a step of reproducing the recorded test signals and evaluating a quality of the reproduced signals by using a predetermined evaluation index; and a step of setting the time phases of the laser pulse and the modulation magnetic field to a time phase of maximizing a recording power margin in accordance with a result of the evaluation.

2. The magneto-optical recording method according to claim 1, wherein the test signal is recorded in two or more adjacent tracks.

3. The magneto-optical recording method according to claim 1, wherein when there are two or more time phases of maximizing a recording power margin, the time phases of the laser pulse and the modulation magnetic field are set to a time phase having a minimum value among lower limit values of the time phases having the maximized recording power margin.

4. The magneto-optical recording method according to claim 1, wherein the recording power margin is decided by upper and lower limit values of the recording power capable of a reproduction signal having a predetermined quality.

5. The magneto-optical recording method according to claim 1, wherein the recording power margin is decided by only a lower limit value of the recording power capable of obtaining a reproduction signal having a predetermined quality.

6. The magneto-optical recording method according to claim 5, wherein when there are two or more time phases of maximizing the recording power margin, a phase relation in which a laser-pulse irradiating timing becomes phase early with respect to the modulation magnetic field is selected.

7. The magneto-optical recording method according to claim 1, wherein the test signal is recorded in a previously formed recording-power test region.

8. The magneto-optical recording method according to claim 1, wherein the test signal is recorded in an unused user region.

9. A magneto-optical recording apparatus for recording information by applying a modulation magnetic field corresponding to information to a magneto-optical recording medium by a magnetic head while irradiating the medium with a laser beam emitted like a pulse, comprising:

means for changing the recording power of a laser pulse while recording test signals on the magneto-optical recording medium and changing the time phases of the laser pulse and a modulation magnetic field while recording the test signals on the magneto-optical recording medium;

means for reproducing the recorded test signals and evaluating a quality of the reproduced signals by using a predetermined evaluation index; and means for setting time phases of the laser pulse and the modulation magnetic field to a time phase of maximizing a recording power margin in accordance with a result of the evaluation.

10. The magneto-optical recording apparatus according to claim 9, wherein the setting of the time phases is performed at a time of shipping inspection in a plant.

* * * * *

UNITED STATES PATENT AND TRADEMARK OFFICE
CERTIFICATE OF CORRECTION

PATENT NO. : 7,136,328 B2 Page 1 of 1
APPLICATION NO. : 10/419845
DATED : November 14, 2006
INVENTOR(S) : Yasuyuki Miyaloka It is certified that error appears in the above-identified patent and that said Letters Patent is hereby corrected as shown below:

COVER PAGE Item (73)
Line 6, change "Canon Kabushiki Kaishi" to --Canon Kabushiki Kaisha--.

Signed and Sealed this

Twenty-second Day of December, 2009

David J. Kappos
*Director of the United States Patent and Trademark Office*